Feb. 24, 1970  YASUYOSHI ONAKA  3,496,605
APPARATUS FOR EXTRUDING RIBBED PLASTIC PIPE
Filed Oct. 25, 1966

INVENTOR.
YASUYOSHI ONAKA
BY Kurt Kelman
AGENT

United States Patent Office 3,496,605
Patented Feb. 24, 1970

3,496,605
APPARATUS FOR EXTRUDING RIBBED PLASTIC PIPE
Yasuyoshi Onaka, 3530–3, Izumi, Komaemachi, Kitatamagun, Tokyo, Japan
Filed Oct. 25, 1966, Ser. No. 589,281
Claims priority, application Japan, Oct. 26, 1965, 40/65,576; Apr. 22, 1966, 41/25,611
Int. Cl. B29d 23/04; B29c 21/00; B32b 3/30
U.S. Cl. 18—14      2 Claims

ABSTRACT OF THE DISCLOSURE

A tubular die member with a mandrel member therein defining therebetween an annular extruding nozzle. The two members are relatively rotatable and the mandrel member is provided with an external helical groove to form an internal helical rib in a pipe extruded from the nozzle. In a modified embodiment the die member is additionally provided with an internal helical groove to form an external helical rib on the extruded pipe.

---

This invention relates to the extrusion of plastic pipes from annular nozzles, and particularly to an apparatus and to a method for the extrusion of a pipe of thermoplastic resin composition having an internal helical rib.

When a liquid carrying solid particles of much greater specific gravity is passed axially through an ordinary cylindrical pipe, the suspended solids tend to settle on the pipe wall and may clog the pipe. This problem is important in dredging operations in which a mixture of sand and water is pumped from the ocean floor through a pipe. It has been found that an internal helical rib in the pipe sharply reduces the tendency of the sand to clog the pipe, and spiral-welded steel pipes were provided heretofore with helical internal ribs along their welded seams if the pipes were to be used in dredging operations of the type described.

The object of this invention is the provision of plastic pipes having internal helical ribs for the same purpose or for similar applications.

With this object and others in view, as will become apparent hereinafter, the invention in one of its aspects resides in an extrusion appartus in which internally helically ribbed pipes may be manufactured from thermoplastic resin compositions based on polyvinyl chloride, polyethylene, or other thermoplastic suitable for the intended application. The appartus includes a tubular die member which has an axis and is mounted on a suitable support, such as the extrusion head of a screw extruder. A mandrel member is coaxially mounted on the support in the die member in such a manner that the die and mandrel members define radially therebetween an annular nozzle which is open in one axial direction. The mandrel has at least one helical groove about the common axis of the die and mandrel members. The groove is radially open toward the nozzle.

When a plastified synthetic resin composition is fed under pressure to an axial portion of the nozzle remote from the open end, and one of the two members defining the nozzle is rotated by a drive mechanism about the common axis relative to the other member and to the support, an internally helically ribbed pipe may be extruded from the open end of the nozzle.

Other features, additional objects, and many of the attendant advantages of this invention will be readily appreciated from the following detailed description of preferred embodiments when considered with the appended drawing in which.

Figure 1:
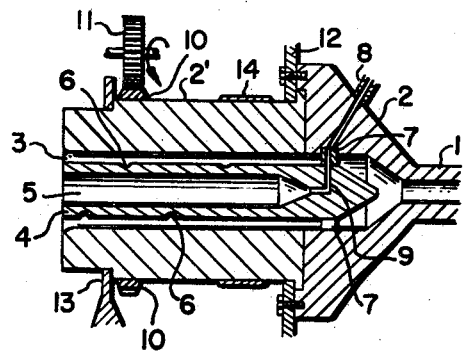
FIGURE 1 shows an extrusion apparatus of the invention in partial elevational section on the nozzle axis.

Referring now to the drawing in detail, and initially to FIGURE 1, there is seen the discharge end of a conventional screw extruder barrel 1 to which an extrusion head 2 is fixedly attached. An annular extrusion nozzle 3 is formed between a heavy tubular die 2′ and a coaxial hollow mandrel 4 whose axial cavity 5 is open in the direction of extrusion. A helical groove 6 whose pitch is greater than the diameter of the mandrel 4 is formed in the outer surface of the latter and is radially open toward the nozzle 3. The mandrel 4 is fixedly fastened to the extrusion head 2 by a spider 7, and its cavity 5 may receive cooling air from an air line 8 through a duct 9 which extends through the head 2, one leg of the spider 7, and the otherwise closed rear end of the mandrel 4.

An external gear rim 10 on the die 2′ meshes with a drive pinion 11 on the non-illustrated frame of the extruder. The pinion 11 is driven by a motor through a transmission (not shown) which also turns the screw of the extruder so that the rotation of the die 2′ is synchronized with the extrusion of plastified thermoplastic material from the nozzle 3. The rear end of the die 2′ is journaled in a recess of the extrusion head 2, and is retained in the recess by a loose flange 12. The front end of the die 2′ is rotatably supported on the extruder frame by a stationary bearing ring 13.

A sleeve 14 on the die 2′ near the head 2 is provided with non-illustrated electrical heating elements for keeping the extrudate at a relatively low viscosity in the usual manner. A conventional cooling sleeve near the discharge end of the die 2′ has been omitted from the drawing for the sake of clarity.

The apparatus shown in FIGURE 1 is operated in the following manner:

A thermoplastic material, such as polyvinyl chloride or polyethylene, is forced by the extruder 1 through the nozzle 3 while the die 2′ is rotated by the pinion 11. An internal helical rib is formed on the plastic tube which is discharged from the nozzle 3 in a helical motion guided by the groove 6. Friction between the extrudate and the mandrel 4 in the groove 6 is held to a minimum by rotating the die 2′ at a speed corresponding to the circumferential component of the extrudate movement. Solidification of the extrudate begins in the nozzle 3 under the combined cooling effect of the air stream in the cavity 5 and the non-illustrated cooling sleeve.

Figure 2:
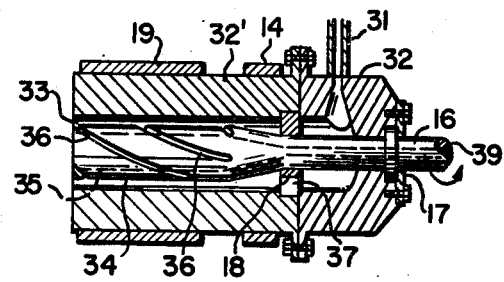
FIGURE 2 shows another extrusion apparatus of the invention in a view corresponding to that of FIGURE 1.

The modified apparatus shown in FIGURE 2 has an extruder barrel of which only the discharge end 31 is seen. It carries a cross-head 32 to which a tubular, cylindrical die 32′ is fixedly flanged. The die 32′ and a coaxial hollow mandrel 34 form the walls of an annular extrusion nozzle 33. A tubular shaft 16 coaxially integral with the mandrel 34 is journaled in bearings 17, 18 in the cross-head 32 and in a spider 37, and is normally rotated by meshing gears, as indicated by an arrow in a manner not further illustrated. The shaft 16 also receives cooling air through its axial bore 39 which communicates with the cavity 35 of the mandrel 34.

Figure 3:
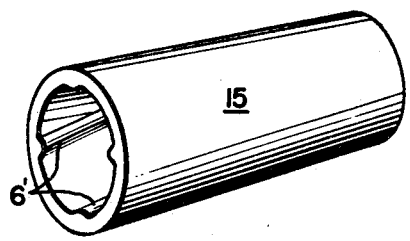
FIGURE 3 is a perspective view of a plastic pipe extruded from the apparatus of FIGURE 2.

Four parallel, helical grooves 36 extend in the otherwise cylindrical outer surface of the mandrel 34 and form corresponding internal ribs 6′ in a plastic tube 15 shown in FIGURE 3, which in discharged from the nozzle 33′ when a hot thermoplastic resin composition is forced into the cross-head 32 by the screw (not shown) in the barrel 31 while the mandrel 34 is being rotated, and the viscosity of the extrudate increases during axial travel through the nozzle 33 from an area heated by a sleeve 14 toward another area cooled by a cooling sleeve 19 equipped with cooling water ducts (not shown). The rotary speed of the mandrel 34 and the extrusion rate are correlated in such a manner that the tube 15 is discharged from the nozzle 33 in an axial direction without significant angular movement about the nozzle axis. The grooves 36 slope clockwise inwardly of the nozzle 33, and the shaft 16 is rotated in the same circumferential direction as indicated by an arrow.

The apparatus shown in FIGURE 4 combines the extruder 31, cross-head 32, and rotating mandrel 34 described with reference to FIGURE 2 with a fixed tubular die 42 whose rear portion 20 has a smoothly cylindrical inner face whereas the front portion near the discharge opening of the apparatus has an internal helical groove 21 of relatively shallow pitch. Whereas the grooves 36 of the mandrel 34 are right-handed, the groove 21 in the die 42 is left-handed. The inner end of the groove 21 is connected to the barrel 41 of a second screw extruder, not otherwise shown, by a radial bore in the die 42. A heating sleeve 14 and a cooling sleeve 19 are mounted on the die 42 in the manner and for the purpose described above.

Figure 4:
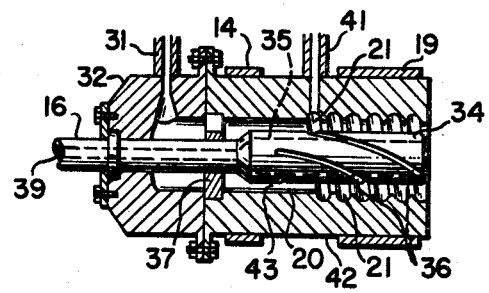
FIGURE 4 illustrates yet another extrusion apparatus of the invention in an analogous view.
Figure 5:
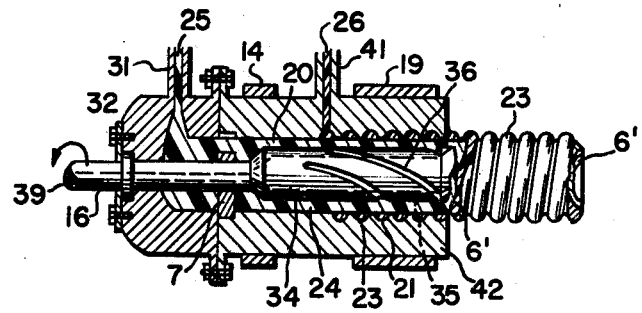
FIGURE 5 shows the apparatus of FIGURE 4 during the extrusion of a pipe therefrom.

The operation of the apparatus of FIGURE 4 is illustrated in FIGURE 5. A polyvinyl chloride composition 25 containing relatively much plasticizer is forced into the rear portion of the extrusion nozzle 43 by the non-illustrated screw in the extruder barrel 31, while a more rigid polyvinyl chloride composition 26 enters the nozzle under pressure through the aforementioned radial bore in the die 42. The mandrel 34 is rotated clockwise, as viewed from the discharge end of the nozzle 43, and at such a rate that the flexible tube 24 is rotated and advances axially through the extrusion nozzle while the relatively rigid rib 23 is discharged threadedly from the grooves 21 of the stationary die 42.

The rib forms a relatively stiff helical spring whose turns are connected by flexible plasticized polyvinyl chloride to which they are integrally welded as they emerge from the extrusion apparatus. The pipe may be further reinforced by placing a steel spiral into the groove between the turns of the rib 23.

The rib 23 is formed in a mold whose walls are constituted by the groove 21 and by the plasticized polyvinyl chloride material 25. It is inherent in the operation of the illustrated apparatus that the initial portion of the extrudate obtained at the start of a run is unsatisfactory, and must be discarded, but continuous production of a satisfactory plastic tube having internal and external helical ribs which are right- and left-handed respectively is readily achieved.

It should be understood, of course, that the foregoing disclosure relates to preferred embodiments of the invention only, and that it is intended to cover all changes and modifications of the examples of the invention herein chosen for the purpose of the disclosure.

What is claimed is:

1. In an apparatus for extruding plastic pipe with internal and external helical ribs, the combination of a support, a tubular die member fixed to said support, a rotatable mandrel member disposed coaxially in said die member to define therebetween an annular extruding nozzle, said mandrel member being provided with at least one external helical groove open to said nozzle, said external groove having a pitch substantially greater than the diameter of said mandrel member, means for feeding under pressure a plastified synthetic resin composition into said nozzle and externa groove, means for rotating said mandrel member relative to the fixed die member whereby a pipe with an internal helical rib may be extruded from said nozzle, said die member being provided with an internal helical groove open to said nozzle, and means for feeding under pressure another plastified synthetic resin composition into said internal groove of said die member, whereby to form an external helical rib on the internally ribbed pipe extruded from said nozzle, the pitch of said internal groove of said die member being substantially smaller than that of said external groove of said mandrel member and the helix of said internal groove of said die member extending in a direction opposite to that of the helix of said external groove of said mandrel member.

2. The apparatus as defined in claim 1 wherein the pitch of said internal groove of said die member is also substantially smaller than the diameter of said mandrel member.

References Cited

UNITED STATES PATENTS

| | | |
|---|---|---|
| 3,283,050 | 11/1966 | Boggs. |
| 3,024,494 | 3/1962 | Szpila. |
| 2,801,441 | 8/1957 | Wadsworth. |
| 3,376,605 | 4/1968 | Beattie. |
| 3,051,989 | 9/1962 | Mercer. |

FOREIGN PATENTS

| | | |
|---|---|---|
| 3,924,128 | 10/1965 | Japan. |

ROBERT F. WHITE, Primary Examiner

R. SHEAR, Assistant Examiner

U.S. Cl. X.R.

264—312